United States Patent [19]

Heflinger

[11] Patent Number: 5,726,786
[45] Date of Patent: Mar. 10, 1998

[54] FREE-SPACE STAR-COUPLED OPTICAL DATA BUS

[75] Inventor: Donald G. Heflinger, Torrance, Calif.

[73] Assignee: The Aerospace Corporation, El Segundo, Calif.

[21] Appl. No.: 561,343

[22] Filed: Nov. 21, 1995

[51] Int. Cl.⁶ .................................................. H04B 10/00
[52] U.S. Cl. ..................... 359/152; 359/121; 359/168; 359/172
[58] Field of Search ...................... 359/152, 172, 359/178, 143, 120, 121, 168, 169–170, 515, 528, 839; 385/46

[56] References Cited

U.S. PATENT DOCUMENTS

| | | | |
|---|---|---|---|
| 4,358,858 | 11/1982 | Tamura et al. | 359/152 |
| 5,247,380 | 9/1993 | Lee et al. | 359/143 |
| 5,247,381 | 9/1993 | Olmstead et al. | 359/120 |

FOREIGN PATENT DOCUMENTS 0018326   1/1989   Japan ........................... 359/152

*Primary Examiner*—Kinfe-Michael Negash
*Attorney, Agent, or Firm*—Derrick Michael Reid

[57] ABSTRACT

A free-space passively star-coupled optical data bus uses uniform uncollimated transmission light communicating data among a plurality of transmitter and receiver paired transceiver nodes of respective communication subsystems for communicating data from one transmitting node simultaneously to each of all of the remaining receiving nodes, the data bus being defined by a transmission volume having peripheral optical ports for optically interfacing the transceivers nodes to the free-space communication transmission medium having a distribution means to distribute the light and provide a variety of data bus configurations each supported by protocol addressing and optical modulation for connectorless communications for improved reliability and reduced costs especially well-suited for conference room, office, and spacecraft applications.

1 Claim, 4 Drawing Sheets

Integrating Chamber Free-Space Star-Coupled Optical Data Bus

Flat Mirror Free-Space Star-Coupled Optical Data Bus

Spherical Mirror Free-Space Star-Coupled Optical Data Bus

Integrating Chamber Free-Space Star-Coupled Optical Data Bus

Direct Path Free-Space Star-Coupled Optical Data Bus

FREE-SPACE STAR-COUPLED OPTICAL DATA BUS

STATEMENT OF GOVERNMENT INTEREST

The invention was made with Government support under Contract No. FA7056-93-C-0041 awarded by the Department of the Air Force. The Government has certain rights in the invention.

FIELD OF INVENTION

The present invention relates to data communication through free-space. More particularly, the present invention relates to free-space optical data buses having passive star-coupled configurations using simultaneous uniform distribution of uncollimated light transmitted through free-space for communicating data among a plurality of optical transceivers.

BACKGROUND OF THE INVENTION

The conventional data bus utilizes electrical wires to transfer data between the different subsystems on the bus. This interconnection via electrical wires results in several disadvantageous conditions. The electrical wires require a an electrical connection to the subsystem which either involves an electrical connector or more permanent attachment such as a terminal screw post or soldered joint. Applications that require the removal of a subsystem from the data bus generally use electrical connectors which are susceptible to physical damage and can experience failure. Often additional time is required to perform the electrical connection and route the electrical wires of the data bus around the subsystems. The presence of the interconnecting electrical wires between the subsystems places a constraint on the locations and accessibility of the subsystems.

Recent introduction of the fiber optic data bus has not alleviated these disadvantages. The optical fiber that replaces the electrical wire still must be routed around the subsystems. The fiber optic connectors or optical splices that replace the electrical connectors and joints are also susceptible to physical damage and can experience failure. Additional time and effort is still required to introduce an additional subsystem onto the data bus.

These physical constraints of the conventional electrical wire and fiber optic data bus have impeded its application in many circumstances. One such application is that of the conference room. Currently, the technology exits for each attending member of the conference to bring their own subsystem, such as a lap-top or notebook computer, to the conference room and connect it to an electrical wire or fiber optic data bus to allow the exchange of computer information during the conference. The inconvenience of having to make a physical connection to each lap-top or notebook computer and route the electrical wire or optical fiber between all the computers for just the duration of the conference has prevented this from becoming a common place activity.

Another similar application of the conventional electrical wire or fiber optic data bus that has disadvantages is the interconnection of computer peripheral devices, such as printers, fax machines, telephone modems, and plotters to several different computers within a single office. Presently, this interface is done using an electrical wire or fiber optic data bus. The level of effort required to make changes or add additional equipment with this type of data bus interface is substantial. There is also the difficulty of routing the electrical wire or fiber optic throughout the office so as not to interfere with the personnel and equipment.

A third application of the conventional electrical wire data bus that has disadvantages is on a spacecraft. The conventional data bus on a spacecraft is provided by a wire harness which must be connected to nearly every subsystem on the spacecraft. This interconnection via copper wires results in several conditions that are currently of concern in light of the new economic limitations being imposed on both military and commercial spacecraft. The weight contribution from the wire harness can be as much as seven percent of the total spacecraft weight which introduces additional launch costs. The physical routing of the wire harness often traps subsystems behind the wires resulting in additional time and costs to remove and replace defective subsystems during test and integration of the spacecraft. In addition, the wire harness must interface to each subsystem via a physical connector that uses many small pins which can become damaged during assembly resulting in additional costs and lost time. The additional testing to insure the integrity of each wire connection also adds to the cost of the conventional wire harness.

Recently, fiber optics have been introduced to replace the conventional copper wire harness on spacecraft. In particular, a standard fiber optic data bus has been employed called MIL-STD-1773. Optical fiber is lighter than copper wire and can make a significant weight reduction particularly for carrying high frequency information which requires relatively heavy coax cable. However, a fiber optic data bus can still lead to trapped subsystems when the fiber must cross in front of a subsystem. In addition, the connector interface for fiber requires accurate alignment and is susceptible to damage during assembly. Also, the integrity of the connection must be tested just as in the case of a wire harness.

Optical data transmission through free-space has been long used to enable communication over varying distances ranging from micrometers in micro circuits to exterrestial distances such as those to earth orbit satellites. Various means have been employed, for example, the use of a laser transmitting modulated beams to a receiver. As system requirements become more complex and demanding, systems have correspondingly evolved into a wide variety of system configurations and levels of performance using differing techniques, apparatus, and methods. Free-space is the spatial medium through which light propagates without the aid of a conduit such as a fiber optic, light pipe, wave guide, and the like structural communication means. Free-space include both vacuum and gaseous mediums, such as the atmosphere. An apparent fundamental goal is to rapidly communicate data from one or more transmitters to one or more receivers, or amongst a plurality of transceivers using an optical system in a cost effective and efficient manner. Various of these systems are discussed with corresponding advantages and disadvantages.

U.S. Pat. No. 5,247,380 by Lee, et al. issued Sep. 21, 1993 and U.S. Pat. No. 5,247,381 by Olmstead, et al. issued Sep. 21, 1993 teach active star electronic coupling of optically transmitted data. Active coupling uses a hub that electronically detects the optical signal, possibly evaluates, and retransmits the optical signal to another node within the system. Star coupling is the nodal communication configuration of a plurality of transceivers each typically consisting of a transmitter and receiver pair which communicate with a plurality of other transceivers within a system of transceiver nodes. Patent 380 teaches means which transmits data optically in free-space between a plurality of terminals. The configuration described is a chain of point-to-point communication links where transmitters on each terminal send light to corresponding receivers on adjacent terminals. The signals are actively received, electronically processed to determine the address and recover the data, and then retransmitted again to another terminal as necessary. The active electronic point-to-point retransmission is a near equivalent function to a passive free-space star-coupler system except that the information is not distributed to all the receivers. This electronic retransmission is an example of point-to-point connections for coupling optical terminals together. Patent 381 teaches means which transmits data optically in free-space between a plurality of terminals by having all the transmitters send the data to corresponding receivers on a common central hub where the data is actively received and electronically processed to determine the address and is then retransmitted to the appropriate terminal. This patent teaches the near equivalent function, via an active electronic star-coupler, of the passive free-space star-coupler in the new patent, except that the information is not distributed to all the receivers as is the case in the new patent. This patent serves as an example of the prior art for electronic active star-coupling of optical terminals.

Several forms of passive fiber optic star-couplers have been developed. Some fiber optic star-couplers use y-branch optical waveguides to distribute the light, while others use evanescent coupling of the light between adjacent optical fibers that have had their cladding removed. A performance aspect is how efficiently can the star-coupler equally distribute the light entering one fiber to all the other fibers. The passive fiber star-coupler requires a lot of transmitted optical power to provide enough light for each fiber and thus has not found much usage except on aircraft and spacecraft where the advantages of simplicity and reliability have outweighed the high optical power requirements. One example system that utilizes a passive fiber star-coupler is the MIL-STD-1773 optical data bus.

The data bus communication requires a communication protocol to transfer data from one subsystem to another. In a serial data bus configuration, all the information, including the protocol, must be transmitted only on the data bus. Many different protocols are applicable to the star-coupled configuration. Some protocols are embodied in established standards such as MIL-STD-1553 and MIL-STD-1773 which allocate one node as the bus controller. Other protocols used for star-coupled data buses utilize a token, which is a series of data bits that comprise a specific data word, that is passed between nodes. The node that holds the token, that is the node that was directed to receive and hang onto the token, is the only node that can transmit data onto the data bus. This token passing prevents bus contention, which occurs when more than one node attempts to transmit on the data bus. The composition of the token is not constrained by the physical configuration or the data bus.

Another protocol used on a star-coupled data bus is one which allocates a specific interval of time in which each node can transmit its data on the data bus. Each node has its own unique time interval so that bus contention is prevented. Protocol formats, such as Asynchronous Transfer Mode are enabling a wide range of data types, including voice and video images, to be transmitted across the country on optical fiber to thousands of users via the Synchronous Optical Network. A similar, but unique, passive star-coupled protocol is used for digitized radio network transmissions between a large number of independent small radio stations, called packet radio transceivers. The protocols used for packet transmissions by police departments, amateur radio operators, and businesses requiring mobile information exchange, such as airport car rentals, are just a few examples.

Timing on a serial data bus can be achieved by extracting a clock signal from the encoded data. Several approaches are in use to encode data that enable extraction of the clock. MIL-STD-1553 and MIL-STD-1773 use a data encoding code called Manchester that introduces a clock transition into every data bit. Non-return-to-zero has also been used. The Fiber Distributed Data Interface is a commercial fiber optic data bus that uses straight non-return-to-zero data transmission with an encoding called 4B/5B. This code encodes every 4 bits of data into 5 bits and thereby insures that even when a string of zeros or ones is transmitted there will be enough transitions occurring in the data stream to extract the clock. Fibre Channel is another commercial standard that recovers the clock in a similar way from data encoded using 8B/10B.

Current fiber optic commercial systems, such as Synchronous Optical Network, utilize data rates of 2.48 Gb/s. This is possible in part because fiber optic cable supports very high data rates over very long distance spans. But even for short distances, optical transmission of data presents a high data rate capability, which is one of the most important attributes provided by an optical data bus. Various modulation techniques have been used in fiber optics, for example, amplitude modulation, coherent frequency modulation and phase modulation. Electromagnetic immunity of the optical data bus for all types of modulation is an important advantage over conventional electrical wire data buses. Weight savings, critical for satellite applications, are possible using an optical data bus. These advantages motivate the application of an optical data bus on satellites.

U.S. Pat. No. 5,266,794 by Olbright, et al. issued Nov. 30, 1993 and U.S. Pat. No. 5,200,631 by Austin, et al. issued Apr. 6, 1993 teach the use of simultaneous distribution of data. Patent 794 teaches the use of an array of transmitters that simultaneously send light in a collimated beam to a corresponding receiver. Each receiver disadvantageously only receives light from its single corresponding transmitter. The geometry is for two adjacent small integrated circuits or a chip to chip configuration. Patent 631 teaches the use of collimated beams transmitted simultaneously from an array of transmitters on one chip that are received by a corresponding array of receivers on another chip. A beam path can pass through a via hole in one chip onto a receiver on another chip. There is disadvantageously a one-to-one correspondence between transmitter and receiver. One-to-one correspondence disadvantageously limits possible applications. These one-to-one simultaneous communication applications with collimated beams are well-suited for chip-to-chip communication but are disadvantageously limited and not well suited for transmitting simultaneous data from one transmitter to a plurality of receivers.

U.S. Pat. No. 5,291,324 by Hinterlong, issued on Mar. 1, 1994, U.S. Pat. No. 5,297,068 by Guilfoyle, et al. issued Mar. 22, 1994, U.S. Pat. No. 5,206,497 by Lee issued Apr. 27, 1993, U.S. Pat. No. 5,204,866 by Block, et al. issued Apr. 20, 1993, and U.S. Pat. No. 5,113,403 by Block, et al. issued May 12, 1992 relate to passive star optical coupling using simultaneous data distribution.

Patent 324 teaches the use of passive star coupling provided by lenses to couple the Fourier plane to a receiver array plane with the use of simultaneous reception. The system is designed to allow for optical processing of the information. The light is not uniformly distributed to each receiver element, for the information is in the spatial intensity variations, not in temporal information. An array of optical transmitters enables transmission into free-space. The array of optical receivers detect free-space transmitted light. Only collimated free-space optical paths are used to perform a comparison. Special imaging optics are used to transform the collimated beams onto an optical electronic integrated detector circuit. Special circuits perform a comparison. Multiple transmitters transmit their light conveyed to more than one receiver simultaneously and passively. However, the information derived from the receivers is not used individually, as is required by each node of a data bus, but instead is used collectively to perform a comparison. The transmitted light is not uniformly distributed to each receiver element, but instead is allowed to become distributed non-uniformly among the receiver elements depending on the nature of the signal to be transmitted. It is the nonuniform distribution of light that is used to perform the comparison to perfect the Fourier transformation. The system does not uniformly distribute the transmitted light to all of the receivers for the purpose of simultaneous passive information transmission and thus is disadvantageously not applicable as a general optical data bus.

Patent 068 teaches the use of a free-space star-coupler having a single receiver which simultaneously receives data from a plurality of transmitters all transmitting simultaneously. Free-space light propagation is used to perform interconnects between the nodes. Light is transmitted in parallel from more than one source, each providing independent optical modulation for serial binary bit inputs and is received simultaneously by one optical receiver. The receiver can perform a Boolean algebra function on the simultaneously received information using the optical interconnects. Control means, namely collimated beams, keep all of the optical paths independent until they are combined onto the common optical receiver by a focusing lens. A plurality of optical transmitters are used each being independently but simultaneously modulated providing a respective binary bit input. The transmitters enable simultaneous reception by the optical receiver which then performs the Boolean algebra function. This system is disadvantageously limited to a single receiver system for a particular specific Boolean operation.

Patent 497 teaches the use of collimated light in a free-space passive star-coupler and in a beam splitter to simultaneously send light to two separate receivers. One receiver is part of a plurality of receivers and the beam can be switched to any of the receivers within the array, although only one is used at a time. The other receiver is used for determining the position of the beam, and thus the optical information transmitted on the beam is disadvantageously not received by all of the receivers. The transmitted information is communicated to only one receiver at a time, even though the light is optically simultaneously detected by two receivers.

Patent 866 and 403 teach the use of a collimated beam that is simultaneously sent through a passive star-coupler using beam splitters. The beam is split and communicated to all the other receivers to form a data bus. However, the distributed light to each receiver is not uniform, and the receivers were designed to accommodate for this variation. This non-uniform distribution and split collimated beam disadvantageously increases design complexity.

U.S. Pat. No. 5,296,950 by Lin, et al. issued Mar. 22, 1994, U.S. Pat. No. 5,311,345 by Cloonan, et al. issued May 10, 1994, and U.S. Pat. No. 5,256,869 by Lin, et al. issued Oct. 26, 1993 teach other star-coupling arrangements.

Patent 950 teaches the use of a passive star-coupled receiver array to convert spatially modulated free-space light into electrical signals. The system uses free-space optical propagation. The receivers are disadvantageously not for independent use in receiving temporally modulated information. The system uses a spatial light modulator to impart information onto the optical beam and thus relies upon the association of unique modulations applied simultaneously to different parts of the same beam. The information is derived from the association between the beam and respective modulation by detecting each modulated portion of the beam with a unique detector that does not respond to other modulated spatial portions. The system disadvantageously does not solve the problem of transmitting the same information simultaneously to all the nodes of a data bus.

Patent 245 teaches switched star-coupling. Although the system has a passive free-space star-coupler, it does not simultaneously transmit to all receivers. The system uses free-space propagation of modulated light that can be directed to many different receiving nodes, but disadvantageously can only transmit to one node at a time. Network stages are used to direct the light transmitted from one node to a specific receiving node thereby performing the function of a switch while preventing transmitted light from reaching the other receiving nodes to which the light can also be directed. A special device is disadvantageously required to perform the switch function. The system does not distribute the light information simultaneously to all the receiving nodes and disadvantageously sends the light information to only one node at a time, even though the transmitted light can, through switch selection, be distributed to any one of the many receiving nodes. Patent 869 teaches that collimated beams can be switched to be received by one receiver of an array of receivers. The free-space star-coupler is also disadvantageously used to communicate light to only one receiver at a time.

U.S. Pat. No. 5,291,325 by Elliott issued Mar. 1, 1994, U.S. Pat. No. 5,259,446 by Johnson, et al. issued Oct. 25, 1994, U.S. Pat. No. 5,359,448 by Laszlo, et al. issued Oct. 25, 1994, U.S. Pat. No. 1,192,863 by Kavehrad, et al. issued Mar. 9, 1993, U.S. Pat. No. 4,764,982 by Pfund issued Aug. 16, 1988, U.S. Pat. No. 4,664,518 by Pfund issued Jan. 12, 1987, and U.S. Pat. No. 4,279,036 by Pfund issued Jul. 14, 1981 relate to uncollimated free-space light distribution.

Patent 325 teaches the use of uncollimated free-space light transmission which avoids accurate beam directional pointing. An optical transmitter of any wavelength between ultraviolet and far infrared can be used for data communication. A window enables light transmission. The transmitted light is communicated to a single external responsive receiving device. Hence; the transmitted light is disadvantageously not communicated to more than one receiver nor communicated simultaneously to more than one receiver.

Patent 446 teaches transmitting a collimated beam over a large distance, such as between a ground transmitter and an aircraft receiver. A long free-space optical path length is used for optical communication between aircraft and ground. The beam is fanned over a large angular spread region, but is directed to only one receiver. Wide angular beam spread is provided by conventional LEDs, but no provision is made for laser diode use which might otherwise provide a narrow beam, such as that provided by solid state diode pumped lasers. Light levels are much lower using only LEDs. A conventional photodiode with a parabolic concentrator is used as a receiver. A shroud and special current shunt to filter background light signals is used to remove sources of noise. Only one receiver can receive light of the transmitter disadvantageously prohibiting simultaneous communication to two or more receivers, thereby prohibiting use as a passively coupled optical data bus. The system is only suitable for long range optical free-space communications between two nodes such as a transmitter on an aircraft and one on the ground. The system does not enable star-coupling.

Patent 448 discloses an array of infrared transmitters driven simultaneously with the same identical information so as to increase the output power and deliver an uncollimated beam for free-space communication providing increased angular spread directional pointing. An infrared signal transmitter communicates light through free-space. A plurality of infrared transmitting elements are used to transmit the same information simultaneously to provide a more powerful light beam than is achievable using just one infrared transmitter. A plug-in connector is used to mount the transmitting elements to the signal generator. Many optical transmitters operate simultaneously to deliver the same information through the modulation of a composite light beam to provide a suitable transmitter for a free-space optical data bus communication. Multiple receivers are not used in a simultaneous passive free-space optical data bus. The uncollimated beam is disadvantageous not applied to simultaneous passive star-coupling using an array of receivers.

Patent 863 teaches the use of an optical taper that is a conical light guide for funnelling and increasing optical power intensity to the collection area of a photodiode for improved free-space communications. Although this system does increase the field of view of a photodiode, the system disadvantageously does not allow several laser transmitters, positioned at different angles with uncollimated beams, to be received by the photodiode.

Patents 982, 518, and 036 teach that a divergent uncollimated beam can diverge enough to be received by more than receiver, and teaches that covert communication to only one receiver is enabled when the divergence is very small in the collimated beam. The system disadvantageously collimates light beams for covert communication to only one receiver.

U.S. Pat. No. 5,321,639, Krishnamoorthy, et al., Jun. 14, 1994 teaches the use of a free-space passive star-coupler to uniformly distribute transmitted light simultaneously over a specific subset of receiver nodes of a larger receiver array. The specific subset of receiver nodes illuminated by each transmitter are chosen to be able to perform matrix algebra. The system configuration is suitable for chip-to-chip free-space communication. The array of optical transmitters communicate through free-space to a subset of an array of optical receivers to specifically perform matrix algebraic processing. One optical transmitter simultaneously distributes light to a subset of optical receivers in a larger array of receivers.

The specific application to matrix-algebraic processing is performed by having each optical transmitter simultaneously distribute its light to a specific subset of the array of optical receivers. Each transmitter is disadvantageously simultaneously distributed to only a subset and is not distributed to the remaining optical receivers in the entire array. The system is disadvantageously limited to only matrix-algebraic processing and thus selectively restricts the distribution of light to only a subset of the optical receiver array. Each transmitter within the system disadvantageously does not communicate with all of the receiver nodes. The system thus cannot perform general data distribution functions in a general purpose communication system.

U.S. Pat. No. 5,136,671 by Dragone issued Sep. 4, 1992 teaches the use of uniformed distribution in a free-space star-coupled system. The system uses a wavelength selective switch that uses free-space propagation in conjunction with optical fiber inputs. The free-space junctions in the system are passive free-space star-couplers that simultaneously communicate light uniformly to all fiber inputs functioning as receivers. Each transmitter cannot simultaneously communicate with a plurality of receivers because each receiver is structurally limited to a predetermined wavelength and hence not true simultaneous communication. The center switch uses fiber optics and is hence not a true free-space communication system. The lengths of fiber connecting two such free-space star-couplers determine how the light will be launched in the second free-space star-coupler. Particular wavelengths will launch the light across this second free-space coupler so that it constructively inputs to just one fiber, thereby performing passive wavelength switching of the light.

While the above systems have various means and features of a general purpose free-space star-coupled optical data bus they have disadvantageously failed to integrate these features in a general purpose free-space star-coupled optical data bus. These and other disadvantages are solved and reduced to practice using the present invention.

SUMMARY OF THE INVENTION

An object of the present invention is to provide an optical free-space communication system using simultaneous and uniform transmission of data.

Another object of the present invention is to provide a passive optical free-space data bus comprising a plurality of transceiver nodes for simultaneous data communication from any one transmitter node to the remaining number of receiver nodes using uniformly distributed light.

A further object of the present invention is to provide a passive free-space data bus which star-couples a plurality of communication transceiver nodes using beam spreading so as to simultaneously communicate data from any one transmitting node to the remaining receiving nodes.

Yet another object of the present invention is an optical distribution means for simultaneously communicating data from any one transmitting transceiver of a plurality of transceivers to all other coupled receiving transceivers.

A passive free-space star-coupled optical data bus comprises a plurality of nodal transceivers each of which are for communicating data simultaneously to the remaining transceivers using uniform distributed light which is preferably uncollimated. The system uses free-space optical propagation. Free-space propagation of light is directed to many different receiving nodes. The light transmitted from one node is directed to all other nodes. Passive star-coupling of all the nodes on the data bus through the spreading of free-space transmitted light enable flexible and reliable system communications. The spreading of the light through optical distribution means enables simultaneously communicating the light from one transmitter to a plurality of receivers. An array of optical transmitters, each supporting a node for an individual subsystem, enables the transmission of light into free-space. An array of optical receivers, each supporting a node for an individual subsystem, detects free-space transmitted light. The transmitters and receivers are preferably associated as transceiver pairs to support a node for an individual subsystem. Each optical transmitting transceiver can simultaneously distribute light to the remaining array of optical receiving transceivers.

The data bus enables optical transmission of information simultaneously to all the nodes of a data bus. Each optical transmitter can transmit light to every other optical receiver in the system of communication transceiver nodes. At least a portion of the transmitted light is a diverging uncollimated beam. Preferably, no special imaging optics or collection optics of the receivers are required, although improved performance can be achieved using such optics. No special filtering is required, and general transmitter receiver optical pairs can be used. Diverging beams cause the light from each transmitter to overlap to be simultaneously received by many optical receivers. Only one of the plurality of optical transmitters is operated at any one time. More than one optical receiver simultaneously receives the transmitted data. Uncollimated free-space light transmission is used to passively couple a plurality of receivers. Light wavelengths are preferably between the ultraviolet and far infrared range. Application of light at the eye-safe wavelength of 1.55 μm has the advantage that the vitreous humor within the human eye absorbs this light preventing this light from reaching the retina where it might cause damage to the human eye. Use of this eye-safe wavelength enables application of the free-space star-coupled data bus in human environments such as conference rooms and offices.

A window lens or other suitable light distribution means is used to direct light transmission to the other receivers. Transmitters, such as LEDs or laser diodes, may be used. Redundant transmitters may be used for increased power distribution to increase transmitted light levels. Receivers such as PIN photodiodes and avalanche photodiodes may be used. The photodiode receiver could also employ a doped fiber preamplifier to boost the level of the optical signal for use with suitable transmitters emitting in the wavelength gain region of the doped fiber amplifier. Such transmitters include laser diodes, diode pumped fiber amplifiers, and other types of lasers such as solid state diode pumped lasers. Dopants of the fiber amplifiers may include erbium, praseodymium, neodymium, and ytterbium. Optical amplification can improve the optical receiver sensitivity of existing PIN or avalanche photodiodes. A shroud and special current shunt may be used for noise reduction. Collection optics may be used on the receiver for improved reception. The field of view of the photodiode receiver and associated collection optics, if any, enables several laser transmitters to be positioned at different angles with uncollimated beams.

High data rates are enabled by suitable receiver sensitivity, which is typically limited by thermal noise for unamplified PIN and avalanche photodiodes. Lower data rates reduce the required level of transmission power or increase the distance over which the free-space star-coupled data bus can be used. The limitations in the upper data rate do not stem from the free-space optical configuration for the data bus, but instead are established by technology limitations in modulating optical sources at high data dates at high optical output powers.

The passive star-coupled data bus enables passive transmitting and receiving for all the nodes without data recovery and retransmission electronics. The passive star-coupled data bus reduces latency delays and system complexity. The free-space star-coupled data bus can replace fiber optic star-couplers. Thus, the free-space star-coupled data bus can use existing star-coupled protocols. Protocol addressing in a star-coupled data bus prevents bus contention, that is to prevent more than one node from trying to transmit its data onto the bus at the same time. The star-coupled free-space data bus cannot support more than one node transmitting at one time. Data transmission is allocated to just one node at any one time and all the other nodes are delegated to receive during that time. For a node to transmit data, the data bus must be first allocated to that transmitter node so that no other node will try to transmit at the same time. The protocol is used to identify the transmission node and the receiving node of a plurality of receiving nodes. The present invention can advantageously be adapted to use many existing star-coupled communication protocols.

The present invention may use various modulation techniques for example, amplitude modulation, coherent frequency modulation or phase modulation. Amplitude modulation, for example, which has lower efficiency, is the type of modulation currently used by existing commercial optical fiber networks and data links. The optical data bus provides general communication capabilities with preferably uncollimated light uniformly and passively distributed amongst a plurality of nodes through free-space without an active intermediate redirectional optical means. A free-space optical data bus uses no medium to convey the light for data transfer. The free-space transmission of the data on an optical light beam without any conveying medium greatly reduces the weight of the data bus. The lack of any conveying medium makes it possible to access subsystems behind any part of the data bus for easy replacement during test and integration. The interface between each subsystem and the data bus is connectorless to reduce possible damage. This connectorless interface simplifies testing and integration.

The free-space star-coupled optical data bus may be used for conference room meeting applications. In this application, each attending member of the conference brings their own subsystem, such as a lap-top or notebook computer, and utilizes the free-space star-coupled optical data bus to tie into a network of all the attenders. Each attender's subsystem uses a connectorless free-space optical interface that does not require the routing of any electrical wires or optical fiber. The absence of an electrical connector or fiber optic connector eliminates the possibility of connector damage or failure from frequent repetitive use. The free-space star-coupled optical interface can be used as the attender holds their subsystem in their lap or rests it on a conference table. Through this free-space star-coupled optical data bus, digitized versions of presentation charts and other documents used during the conference can be transferred to each attender. In addition, private or public comments and questions can be passed between attenders without interruption of the proceedings.

The free-space star-coupled optical data bus may be used for the interconnection of peripheral computer devices, such as printers, fax machines, telephone modems, and plotters to several different computers within a single office. The free-space star-coupled optical data bus allows placement and installation of this equipment to not be hindered by electrical or fiber optic connections and the routing of electrical wires or fiber optic cables. Changes to the equipment placement or the addition or removal of equipment require no modifications to the interfacing data bus network. The connectorless free-space star-coupled data bus allows equipment to be moved, added, or removed without possible damage to a connector or the rerouting of cables.

Free-space star-coupled optical data buses may be used for spacecraft applications. The data bus supports a cost effective modular design. The data bus is a wireless approach to reduce the complexity, weight, and cost of test and integration of the conventional wire harness on spacecraft and other systems. A wireless design uses an optical free-space data bus where information is beamed without connectors or any medium for conveyance between subsystems. Several optical free-space star-coupled data buses approaches of wireless design may be used for increasing system performance. A wireless free-space optical data bus, through connectorless interfaces, supports on-orbit subsystem exchanges along with establishing communication with a subsystem prior to its installation. The wireless free-space star-coupled optical data bus is a significant advancement over hard wired and fiber optic data buses.

The free-space star-coupled optical data bus enables communication of data across a physical separation between two independent subsystems. This connectorless interface can reduce the risk of damage during independent subsystem testing. In space, communication could be established to a docking vehicle prior to physical docking. Communication could also be established between the spacecraft and a launch tower prior to launch without the use of a cable. These and other advantages will become more apparent from the following description or the preferred embodiment.

DETAILED DESCRIPTION OF THE PREFERRED EMBODIMENT

Figure 1:
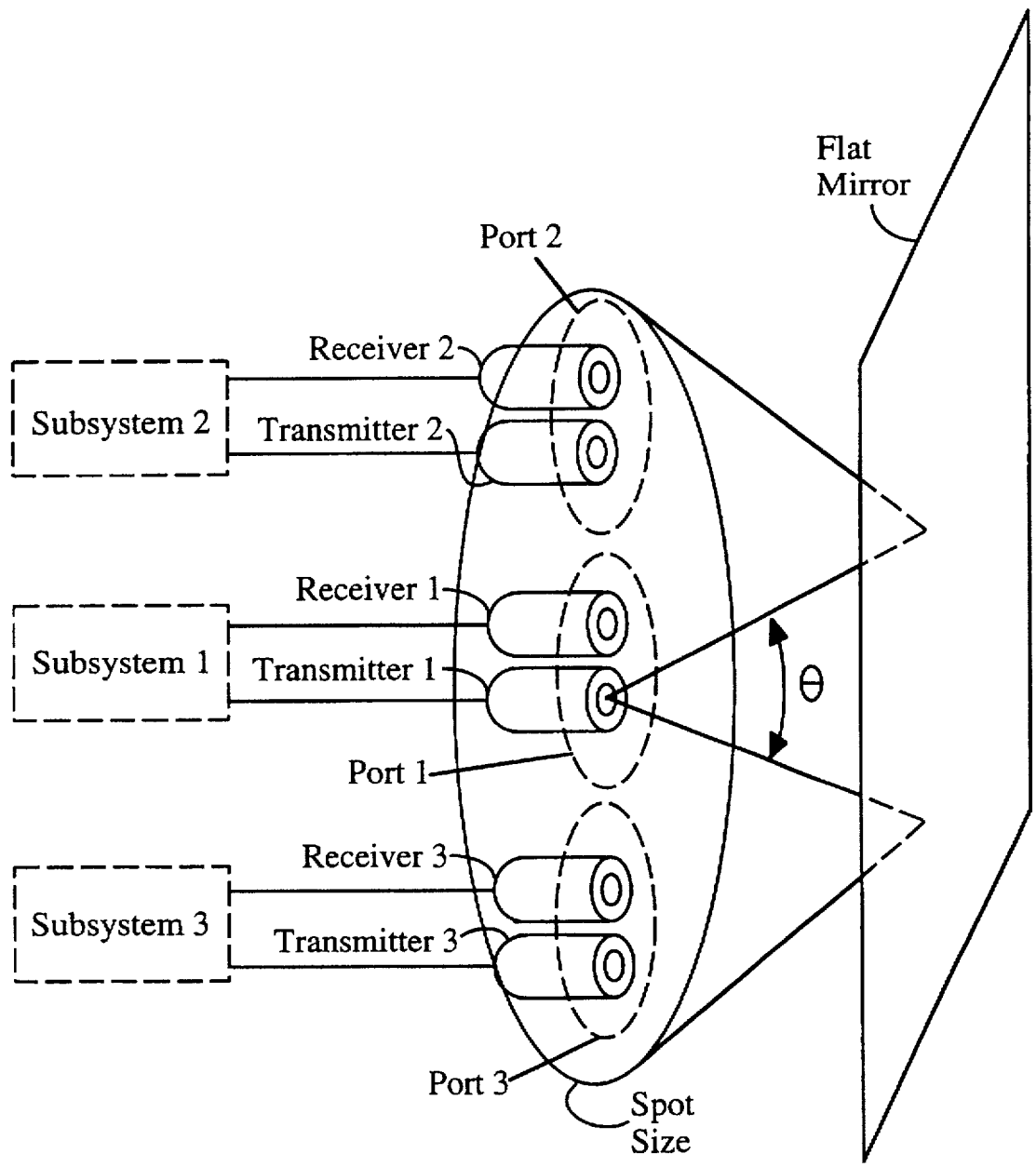
FIG. 1 is a diagram of a flat mirror free-space star-coupled optical data bus.

A free-space star-coupled optical data bus is a communication link which simultaneously transmits data through free-space from one transmitting nodal port to all the other receiving nodal ports in the network of a plurality of transceiver nodal ports. Each optical transmitter node simultaneously communicates data to all the other nodes on the data bus. The free-space data bus uses a passive star-coupler where transmitted light is spread so as to be simultaneously received by all the other receiving nodes. The free-space star-coupled optical data bus has several preferred embodiments as shown in FIGS. 1–4. These embodiments support a connectorless interface by utilizing a window port instead of a fiber connector or electrical connector. The connectorless interface supports sectional architecture exchanges of subsystems. Upper data rate limits have corresponding applications. For example, satellites may require data rates of at least 1 Gb/s to support the transfer of sensor data. Data bus configurations that are limited to data rates of 1 Mb/s may be considered for satellite command and control functions. Data rates of less than 1 Mb/s may be considered for data transfer to printers, fax machines, telephone modems, and plotters in the office environment as well as the transfer of presentation charts, private or public comments, and questions during a conference meeting. A few free-space star-coupled optical data bus configurations may support data rates over 1 Gb/s. Free-space star-coupled optical data bus configurations can support a data rate of 1 Mb/s suitable for command and control functions similar to the MIL-STD-1773 optical fiber data bus used by the Solar Anomalous and Magnetospheric Particle Explorer satellite. Free-space star-coupled optical data bus configurations using data rates of 100 kb/s and proven technology commercially available for the Infrared Data Association standard can support data transfer to other lap-top or notebook computers in a conference room environment or printers, fax machines, telephone modems, and plotters in an office environment.

Information from any of the nodes on the optical data bus is distributed to all the other nodes optically without the use of intermediate distribution electronics. This is similar to that of MIL-STD-1773 where a fiber optic star-coupler is used to perform the passive optical distribution of data. All of the nodes can simultaneously receive any other node using a protocol structure for information transfer on the data bus. Information transfer can be managed similar to MIL-STD-1773 where one node serves as the bus controller. In any protocol approach, proper addressing is required of all the transmitted information because all but the transmitting node receives the data. The use of other existing standard protocols, such as Asynchronous Transfer Mode or the protocol used by Synchronous Optical Network may also be adapted for use in a free-space star-coupled optical bus.

Preferably, on-off keying amplitude modulation of the light is used to transmit data because of its simplicity. The use of other modulation formats, such as coherent frequency modulation or phase modulation, may result in higher data rate performance due to improved receiver sensitivity. Optical preamplifiers in the receiver, such as erbium doped fiber amplifiers, can also enable higher data rate performance. However, suitable data rates, as high as 1 Gb/s, may be supported by non-return-to-zero encoding using direct detection of amplitude modulation. Many applications, such as the transfer of data to printers, fax machines, telephone modems, and plotters do not require data rates above 1 Mb/s and thus can use this encoding, modulation, and detection technique. Direct detection optical receivers applicable to the free-space star-coupled data bus include the silicon photodiode, the indium gallium arsenide photodiode, and the germanium photodiode. Both PIN photodiodes and avalanche photodiodes may be used.

The various free-space star-coupled data bus embodiments utilize ports to support the nodal interaction. The data bus comprises a communication volume defined in part by nodal ports disposed at the volume periphery. The ports are merely transparent communication apertures, preferably a window, through which light can pass. The ports may serve to provide hermetic seals to the subsystems on which the nodes interface. The window port provides for a connectorless interface to the data bus because no physical interaction is made with any medium conveying the light. The connectorless window port eliminates the potential for damage to a connector and supports independent modularity of subsystems for applications such as data transfer over rotating or hinged joints and to docking vehicles. The window port could include appropriate optical filtering so as to only pass the wavelength of light used by the optical data bus and thus filter stray light outside of the transmission wavelength band. A dichroic mirror could perform this wavelength filtering function.

Receiver sensitivity analysis for the upper data rate performance of various free-space star-coupled data bus embodiments considers the fundamental quantum limits associated with shot noise in the time of arrival of photons, dark current noise limits, and thermal noise limits. The data bus configurations have been analyzed for operation with a receiver sensitivity 10 dB above the ideal thermally limited receiver sensitivity using direct detection at a bit error rate of $1\times10^{-9}$. For this analysis, the ideal thermal limit was established by the thermal noise introduced by a 10 k ohm load resistor at 300 K in a transimpedance amplifier that amplifies the photodiode electrical signal. A silicon, Si, avalanche photodiode was used for the analysis with a wavelength sensitivity that peaks at 0.85 µm with a quantum efficiency of 75%. The avalanche gain used in this analysis is 100 with an excess noise factor of 10 stemming from an x value of 0.5. The following receiver sensitivities, corresponding for the listed data rates, were used for the analysis of the embodiments: −33 dBm at 1 Gb/s, −40 dBm at 100 Mb/s, −49 dBm at 10 Mb/s, −56 dBm at 1 Mb/s, and −60 dBm at 100 kb/s. Radiation hard Si avalanche photodiodes having these performance characteristics, up to data rates of 1 Gb/s, have been developed for space applications. The actual light sensitive area of the Si avalanche photodiode used for the analysis is 75 μm in diameter, which reduces the capacitance of the photodiode to a value that is small enough for transimpedance receiver circuits to operate at 1 Gb/s. Smaller light sensitive diameters are available, such as 20 μm, and may enable free-space star-coupled optical data bus operation at data rates over 1 Gb/s.

The laser diode optical transmitters considered for the upper data rate analysis of the various embodiments are a proven technology 200 mW gallium aluminum arsenide, GaAlAs, laser diode emitting at a wavelength of 0.85 μm. Direct large signal amplitude modulation by variation of the drive current to this laser diode can enable data rates of 700 Mb/s. Electronic drive circuitry, using microwave integrated circuits and monolithic microwave integrated circuits may enable higher amplitude modulation data rates. The physical size of the laser diodes and photodiodes may be 5 mm in diameter and 5 mm long, which is the size of the TO-5 package in which the devices are commonly mounted. The physical size of the device package can determine the maximum number of nodes which can be supported in the highest data rate applications of the free-space star-coupled optical data bus configurations.

Embodiments using other types of photodiodes and laser diodes are also possible. In particular, applications utilizing indium gallium arsenide, InGaAs, avalanche photodiodes and gallium indium arsenide phosphide, InGaAsP, laser diodes will enable eye-safe free-space star-coupled optical data bus configurations operating at a wavelength of 1.55 μm. The quantum efficiency of the InGaAs avalanche photodiode at 1.55 μm is 85%. Avalanche gains of 30 with an excess noise factor of 3.5 stemming from an x value of 0.5 are proven technology. Operation at receiver sensitivities 10 dB above the ideal thermal limit imposed by a 10 k ohm load resistor in the transimpedance amplifier will lead to receiver sensitivities of −37 dBm at 1 Gb/s, −46 dBm at 100 Mb/s, −42 dBm at 10 Mb/s, −57 dBm at 1 Mb/s, and −61 dBm at 100 kb/s which are very comparable to the performance of the silicon avalanche photodiode. InGaAsP laser diodes emit at 1.55 μm and deliver 50 mW with developments in progress to increase output powers into the 100 mW range. Thus embodiments utilizing InGaAs avalanche photodiodes and InGaAsP laser diodes will have very similar performance characteristics to the embodiments analyzed using Si avalanche photodiodes and GaAlAs laser diodes.

Lower data rate embodiments may utilize proven technology developed for the Infrared Data Association standard. In particular, the Serial Infrared Physical Layer specification of this standard requires a ±15° minimum viewing angle over the 0 to 1 meter free-space link distance at a data rate of 115.2 kb/s using transmitters in the wavelength range of 0.85 to 0.9 μm. This standard may use transparent substrate aluminum gallium arsenide LEDs transmitters that transmit an uncollimated beam at an optical power of over 30 mW with a diverging angle of 30° and a wavelength of 0.875 um. This standard may use a silicon PIN photodiode receiver with a 5 mm diameter light sensitive region, a receiver sensitivity of −31 dBm at 115.2 kb/s, and a lens enabling a viewing angle of 30°. At a free-space distance of 1 meter, this technology enables optical communication at a data rate of 115.2 kb/s over a 30° angle. This technology is available as discrete transmitters and receivers or as combined transceiver pairs. Although this Infrared Data Association standard technology is intended for point-to-point free-space optical communication between just two subsystems, the large divergence and viewing angle of 30° enables application in the free-space star-coupled optical data bus where a plurality, that is greater than two, of subsystems each using a transceiver can be in simultaneous optical communication as will become apparent from the following description.

By way of example, each upper data rate embodiment of FIGS. 1 through 4 uses non-return-to-zero encoding with on-off keying amplitude modulation using direct detection. The receiver type is a Si avalanche radiation hardened photodiode with a light sensitive area 75 μm in diameter. The receiver sensitivity at a bit error rate of $1 \times 10^{-9}$ is −33 dBm at 1 Gb/s, −40 dBm at 100 Mb/s, −49 dBm at 10 Mb/s, −56 dBm at 1 Mb/s, and −60 dBm at 100 kb/s. The transmitter type is a GaAlAs laser Diode with a wavelength of 0.85 μm at a transmission power of 200 mW. The light from a laser diode is preferably emitted as an uncollimated beam. Transmitted light is collected by electronic photodetection provided by the Si avalanche photodiode. Transmitter lenses spread light into the data bus and receiver lenses collect light from the data bus. The physical distances over which the free-space star-coupled data bus can operate depend upon the data rate as will be described in the analysis of the preferred embodiments.

Although the optical data buses are free-space star-coupled configurations, optical fibers can be used to deliver light from a remote transmitter to the data bus port or to a remote receiver from the data bus port. The light emitted from the optical fibers may be directed by transmitter lenses as uncollimated fanned out free-space beams. Light collected by receiver lenses may focus light onto the ends of optical fibers. The optical fiber typically has a 10 to 100 μm core at a wavelength of 0.85 μm. The optical ports which communicate light from a laser to a photodiode can easily communicate with an optical fiber end with appropriate lenses. Hence, optical fiber may be used with the free-space star-coupled data bus to deliver and collect light prior to and after transmission through the free-space data bus volume.

Referring to FIG. 1, a flat mirror free-space star-coupled optical data bus has passive optical coupling to all nodes by transmitting a beam that is uniformly expanded by angle theta to illuminate all the other data bus nodes. This configuration may use lenses, not shown, or other suitable means, one in front of each laser transmitter. The flat mirror is used to reflect the transmitted light to the other receiving nodes. The alignment of the transmitted beam is dependent on how wide a beam is transmitted. The angle theta of divergence of the beam is determined by a respective lens, or other suitable means such as a holographic optical element, in front of the transmitter node. This arrangement limits physical flexibility to allow a node to be located at a site that is a long distance away from the other nodes. All the nodes must be so co-located to receive the spreading beam that is reflected off the flat mirror. The light from the optical transmitters is preferably spread in a diverging light cone with a transmitting lenses so as to reflect off the flat mirror and canvas a spot size covering all the photodiodes within the node array. The diverging nature of this light reduces the required angular alignment at each transmitting node. In addition, each photodiode may have a receiving lens, not shown, to collect the transmitted light. This lens has a relatively fast f-number so as to allow an image of the entire node array to fit onto a very small high speed photodiode. Microlenses made from gallium phosphide may provide suitable fast f-numbers about 1.0.

The flat mirror arrangement is sensitive to stray reflections such that all optical window ports in front of the lasers and photodiodes preferably have antireflective coatings. Each window port may be a separate window or a defined portion of a spot size sheet of window material. The physical space in which all the nodes must be co-located is defined by the angle theta of divergence of the light from the laser transmitters and the distance of the mirror to the laser-photodiodes transceivers. The flat mirror free-space star-coupled optical data bus provides a simple geometry for comparison applicable to other free-space star-coupled optical data bus configurations. Performance comparisons may be performed without the aid of receiving lenses on the optical receivers.

The flat mirror free-space star-coupled optical data bus requires a defined size of the light spot which illuminates all the co-located transceiver nodes of the data bus. The optical power captured by an optical receiver is determined by the ratio of the area of the photodiode to the area of the light spot. The light level at the array of nodes is a function of the light spot size. For a photodiode that is 75 µm in diameter, and for the case where the flat mirror is 25 cm from the array of nodes, the divergence angle theta of the laser light is 12° to result in a light spot of 10 cm after reflection. At a spot size of 10 cm, the optical power is down to −39 dBm for 200 mW laser diodes and will support data rates of 100 Mb/s. Operation at 1 Gb/s requires −33 dBm of optical power.

The receiving lenses can improve the performance of the flat mirror free-space star-coupled optical data bus. The limit on the size of the lenses which continues to yield improvement is not determined by the size of the beam but instead on the ability to focus all the collected light onto the 75 µm photodiode. Because the light is transmitted from anywhere within the array of nodes, the lenses must focus light from all the other transmitters onto the photodiode.

The field of view of each receiver is increased by decreasing the focal length of the lens. It is necessary that the field of view include all the laser transmitters in the array, but the lens diameter is limited by how small an f-number can be achieved. The f-number is limited by refractive index to about 1.0 for a single element lens. Microlenses fabricated from gallium phosphide have an index of refraction around 3 and enable an f-number of 1.0 to be achieved.

The restriction in the f-number to roughly 1.0 may be obtained by a 0.5 mm diameter, 0.5 mm focal length microlens. To be able to use a lens diameter of 0.5 mm, the separation distance needs to be extended to 33 cm, which in turn requires the divergence angle from the lasers to be reduced to 9°. This reduces the size of the image formed by the laser array so that it will fit entirely on the 75 µm diameter photodiode. A 16 db improvement from this 0.5 mm diameter lens will allow operation with a light level of −23 dBm which, when using 200 mW laser diodes, and will support a data rate of 1 Gb/s at 20 dB above the ideal thermal noise limit. The optical power available in this configuration suggests that higher data rates can be supported; however, the frequency response of the 75 µm diameter photodiode will limit the data rate to around 2 Gb/s. Higher frequency response photodiodes will have smaller light sensitive diameters adversely affecting light collection which in turn can cause the optical power to fall below the required receiver sensitivity for higher data rates. The flat mirror free-space star-coupled optical data bus having 32 ports can support a data rate of 1 Gb/s by using a mirror separation distance of 33 cm and a divergence angle of 9° spanning a spot size diameter of 10 cm from optical transmitters delivering 200 mW each.

The required spot size for the 1 Gb/s data rate configuration depends on the number of nodes and the size of the transceiver package for both the laser and the photodiode. For 32 nonredundant nodes, the array for lasers and photodiodes in the transceiver nodes in TO-5 packages would span an area included in a circle of 5 cm in diameter. For the lasers on the very edge of this array to fully illuminate all the other nodes in the array, the light spot needs to be 10 cm in diameter. A spot size of 10 cm enables a data rate of 1 Gb/s. For lower data rates, such as 100 kb/s used to transfer data to a printer, fax machine, or telephone modem, this spot size becomes 7 meters in diameter when using 200 mW transmitters which is comparable to the size of a conference room or large office and would enable any piece of equipment in the room equipped with a transceiver to interface with the free-space star-coupled optical data bus. The flat mirror would be located on the ceiling of the room in such an application and the eye-safe wavelength of 1.55 µm would be used. At the low data rates, the small 75 µm photodiode can be replaced with a much larger area photodiode that has a lower frequency response further improving the performance to enable lower transmit powers or greater free-space distances to be used.

It is not necessary for all the lasers and photodiodes to be physically located at ports of the node array. The optical transmitters and receivers within the node array can be replaced with fiber optic extensions. Although there are losses associated with fiber coupling from free-space, there is enough margin in the −23 dBm of received optical power to enable the upper data rate in the 10 cm spot size configuration to remain at 1 Gb/s using optical fiber coupling. The nodal array ports could be a collection of optical fiber ends with associated individual lenses on each fiber end. The optical fiber would communicate light to remote located lasers and photodiodes. The photodiode receiver sensitivity would depend on being able to couple all the collected light into the end of the fiber. Free-space to fiber coupling efficiencies are typically limited to roughly 50%. Taking this additional 3 dB loss into account for coupling the transmitted light into the fiber and the 3 dB loss associated with coupling the received light into the fiber yields an additional loss of 6 dB. Thus, the node array using optical fibers extensions and 0.5 mm diameter microlenses on the receivers would operate at −29 dBm to support 1 Gb/s operation at 14 dB above the ideal thermal noise limit. The flat mirror free-space star-coupled optical data bus of clustered transceiver nodes may have upper data rate performance parameters of: data rate of 1 Gb/s; receiver optics of 0.5 mm diameter lens, beam divergence theta angle of 9°; beam spot size of 10 cm in diameter; number of nodes equal to 32; node cluster size of 5 cm in diameter; received optical power of −23 dBm which is 20 dB above the ideal thermal limit. With optical fiber extensions, the performance is the same except that received optical power is −29 dBm which is 14 dB above the ideal thermal limit.

Figure 2:
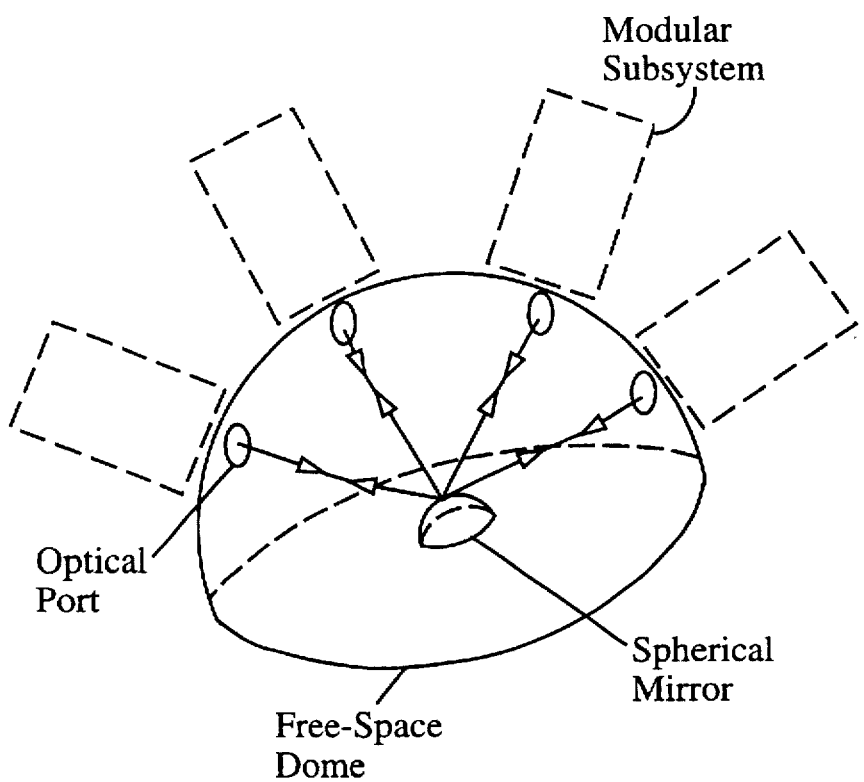
FIG. 2 is a diagram of spherical mirror free-space star-coupled optical data bus.

Referring to FIG. 2, a spherical mirror free-space star-coupled data bus may be used to expand a beam to illuminate an array of data bus nodes clustered and co-located on a free-space volumetric hemisphere. A small spherical mirror performs passive distribution of the transmitted light. A transmitting lens, or holographic optical element, in front of each optical transmitter delivers a collimated beam so as to fully illuminate the spherical mirror with parallel light. The small spherical mirror reflects the light uniformly in all directions so that all the other nodes are able to receive an equal portion of the transmitted light. The light incident on the small spherical mirror does require some angular alignment so as to insure the transmitted light hits the small spherical mirror. Each receiver preferably has a lens in front of the photodiode. However, in this arrangement, the fast f-number requirement is reduced because the lens only has to image the angular extent of the small mirror, not the entire node array. This arrangement trades some additional alignment required from the transmitter for the freedom to use a more easily obtained lens with the receiver. The transmitting lens collimates the transmitted light to reflect off the spherical mirror to all of the clustered nodes. Uniform collimated light is reflected off the spherical mirror which disperses the light uniformly in all directions. Equal light levels are reflected and sent equally to illuminate all the other nodes. An alignment is necessary for the collimated beam to be directed onto the spherical mirror. The tolerance in this alignment stems from how large the collimated beam can be made in diameter. Stray reflections from the window in front of the optical port can degrade the performance of this data bus, so antireflective coating is preferred. In addition, scattering from contamination on the windows could degrade the performance.

The spherical mirror free-space star-coupled optical data bus is a variation of the flat mirror free-space star-coupled data bus. Instead of beam divergence when the light is transmitted from the laser, the light may be first transmitted as a collimated beam to the spherical mirror. The spherical mirror then diverges the beam to illuminate all the other nodes. The spherical area over which the nodes are distributed is also determined by the light spot size. The illumination light spot can canvas one hemisphere of the free-space volume. The hemisphere is centered around each individual transmitting node, but must cover all remaining nodes. This spherical mirror free-space star-coupled optical data bus could also be configured using a cylindrical mirror which spreads the beam over an arc to illuminate a plurality of aligned transceiver nodes.

The spherical mirror free-space star-coupled data bus requires the nodes to be clustered around the top of the sphere so that all nodes have communication with all other nodes. The light spot must canvas twice the size of the array of clustered nodes. The optical power seen at each node, using 200 mW laser diodes, will be the same as that in the flat mirror optical bus provided that the light spot has an area the same as the 10 cm diameter circle, or 78 cm². Assuming that there is no absorption loss from reflection off the spherical mirror, the radius of the sphere which contains the array of nodes is given by the radius of a sphere which has twice the surface area of the light spot, since only one hemisphere can be used. Thus, the minimum spherical radius to support a data rate of 1 Gb/s with an optical received power of −23 dBm using collection lenses on the receivers is 3.5 cm where the surface area of the hemisphere equals 78 cm². The surface area of the node array contained within this hemisphere is only 20 cm².

The spherical radius can be made to be larger than this minimum value of 3.5 cm by allowing the node array to become a smaller portion of the total spherical surface. The only requirement to support a data rate of 1 Gb/s with an optical power of −23 dBm using collection lenses on the receivers is that the illuminated spot of light bounced off the spherical mirror have a diameter of 10 cm. In this way, the spherical radius can span the same range of distances that were possible for the flat mirror free-space star-coupled data bus. In particular, for a distance of 33 cm, the divergence angle for the light bounced off the spherical mirror would be about 17° which, for a 1 mm diameter beam, provides a 0.7 mm radius of curvature of the small spherical mirror. The small spherical mirror performs the divergence of the beam so as to reduce the f-number requirements of the receiver lenses. Using a divergence angle of 17° and a separation distance of 33 cm will allow 32 nodes packaged in 5 mm diameter TO-5 cans and spanning a diameter of 10 cm to be supported at a data rate of 1 Gb/s using 200 mW optical transmitters and collection lenses on the receivers. The data rate will be maintained at 1 Gb/s when the light is communicated to the node array through fiber optic extensions since the optical power of −23 dBm is more than 6 dB greater than the receiver sensitivity of −33 dBm at 1 Gb/s.

When no lenses are used on the receiver, the optical power at each node must be higher. Without the use of lenses on the optical receivers where the spot size of 10 cm in diameter, the light level is too low at −39 dBm even when using 200 mW lasers, to support 1 Gb/s, which requires −33 dBm. This configuration will support a data rate of 100 Mb/s. The use of lenses on the receivers of each node is different than in the flat mirror free-space data bus. This is because the image that is formed by the lenses of each receiver does not have to encompass the area of the node array as in the case of the flat mirror data bus. Instead, the lenses advantageously only need to image the light delivered by the spherical mirror.

The fact that the area which must be imaged is only the size of the spherical mirror, instead of the size of the node array, enables the use of longer focal length lenses, which in turn makes it easier to position a lens onto the receivers. In the case of a 0.5 mm diameter, 0.5 mm focal length microlens as was used in the flat mirror data bus, the performance of the data bus would be the same as it was for the flat mirror data bus. The spherical mirror data bus would be able to support 1 Gb/s using 200 mW lasers with a receive optical power of −23 dBm and a bit error rate of 1×10⁻⁹. This same performance could be achieved using a 0.5 mm diameter lens with a focal length of 1 mm making the f-number 2.0, which is easier to manufacture.

The use of optical fiber extensions to communicate light to and from the node array may be applied to the spherical mirror data bus. The performance will still enable a data rate of 1 Gb/s using 200 mW lasers with a receiver sensitivity of −29 dBm when the light is routed to the node array using optical fiber extensions. However, the difficulty of getting the image of the entire node array to fit into the end of the fiber is greatly reduced since the image size is reduced to just that of the small reflecting mirror. This allows a lens with a focal length of 1.0 mm and an f-number of 2.0 to be used, which can be manufactured by more common materials such as glass instead of gallium phosphide.

Reducing the data rate to 100 kb/s enables a receiver sensitivity of −60 dBm to be used and will enable this spherical mirror free-space star-coupled optical data bus to support a room full of subsystems that is 7 meters in diameter when using 200 mW transmitters. In this application, the small spherical mirror would be located on the ceiling of the room. This can be envisioned by viewing FIG. 2 upside down so that all the subsystem nodes can be located anywhere within the floor space of the room. An eye-safe wavelength, such as 1.55 µm, would be used to allow human occupation of the room. This would enable attendants of a conference to interface their lap-top or notebook computers to each other without making physical connections or routing cables. Presentation charts, private and public comments, and questions could be transmitted via this free-space star-coupled optical data bus without interruption of the conference. It would also enable low data rate office equipment, such as printers, fax machines, telephone modems, and plotters to be interfaced to the computers in the office without connectors or cables. Use of a larger diameter photodiode that has a lower frequency response with a larger light sensitive area will improve the performance in this application enabling lower transmitter powers or greater free-space distances.

The spherical mirror free-space star-coupled optical data bus of clustered transceiver nodes may have upper data rate performance parameters of: data rate of 1 Gb/s; collimated beam diameter of 1 mm; received optical power of −23 dBm; receiver optics of 0.5 mm diameter lens; receiver optics f-number of 2.0; outer sphere radius of 33 cm; beam divergence angle of 17°; small mirror radius of 0.7 mm; beam spot size of 10 cm diameter; number of nodes equal to 32; node cluster size of 5 cm diameter; threshold above the ideal thermal limit of 20 dB. With optical fiber extensions the upper data rate performance parameters are the same except that data Rate is 1 Gb/s and received optical power is −29 dBm which is 14 dB above the ideal thermal limit.

A variant of the spherical optical free-space star-coupled data bus is one adapted to use a cylindrical mirror at the center of the ring and transmitting a collimated beam to the cylindrical mirror. The cylindrical mirror would reflect the collimated beam in a uniform uncollimated fan of light to the other nodes located around a semicircle. There are no nodes directly behind the mirror. A semicircle nodal array is used to ensure that all nodes can be addressed by illumination from any other node.

Figure 3:
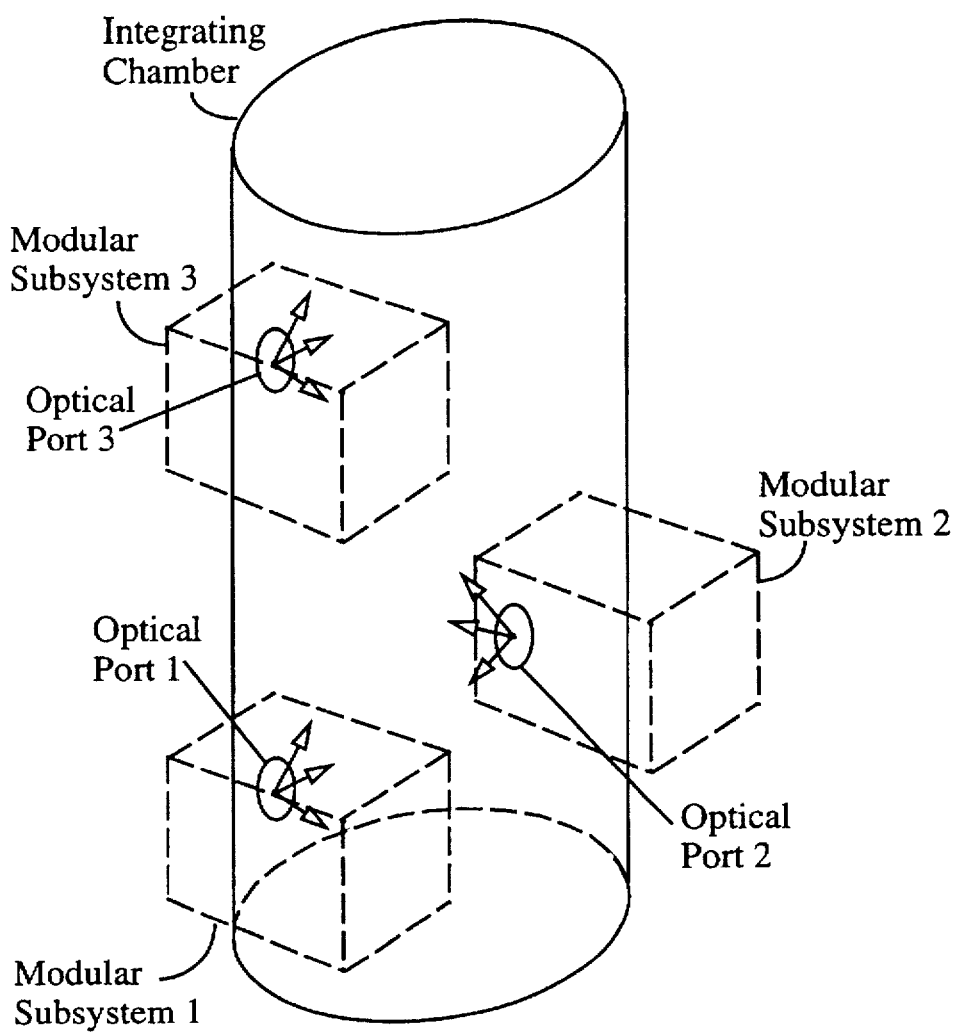
FIG. 3 is a diagram of an integrating chamber free-space star-coupled optical data bus.

Referring to FIG. 3, an integrating chamber free-space star-coupled optical data bus is another preferred alternative without the required optical alignment of the flat mirror and spherical mirror data buses. Using an integrating chamber, the transmitted light is directed at an arbitrary angle and beam divergence into the integrating chamber preferably having high albedo walls, or like surfaces, so that the light is re-emitted or reflected in all directions at relatively high efficiencies. The use of a high albedo surface in the integrating chamber advantageously achieves alignment free operation. Light is merely directed, at an arbitrary angle and beam divergence, into the chamber and then re-emitted in all directions. Some of the light will illuminate the other optical ports where it is received by all of the other nodes. Advantageously, no lenses are used for either the optical transmission or the reception. Disadvantageously, there is no control on the particular path through which the light passes to get to a particular optical port. Since light travels at a finite speed, the presence of multi-pathing inherently restricts the upper data rate. For an integrating chamber 4 cm high and 4 cm in diameter, a data rate of 10 Mb/s can be supported using 200 mW optical transmitters. The data rate restriction depends on the physical size of the integrating chamber. For a chamber 2 meters long, the transit time is about 7 ns, which means that individual data pulses will not be resolvable at data rates in excess of roughly 100 Mb/s. Thus, competition between multiple reflections leading to multi-pathing will not present a problem for data rates less than 100 Mb/s, although small chambers are most preferred to achieve modest data rates.

Assuming that the high albedo inside surface of the integrating chamber imparts an optical loss of 10 dB on the light which is to bounce inside, the performance of the data bus can be determined by considering the surface area over which the light can be uniformly distributed and yet still provide enough light to support the desired data rate. In this case, the light appears to come to the optical receiver from all directions and thus is difficult to image onto a small 75 µm diameter photodiode with a single lens. Thus, preferably no receiver lens is used to allow for an alignment-free operation.

The upper data rate of the integrating chamber free-space star-coupled optical data bus is a function of how much surface area must be illuminated. For operation at 10 Mb/s using 200 mW lasers, the optical power at the receiver needs to be −49 dBm. The spot size diameter corresponding to an optical power of −39 dBm before experiencing the losses associated with bounce on the surface of the integrating chamber is only 10 cm in diameter or a total of 78 cm$^2$. After reflecting off the surface of the integrating chamber, the optical power is reduced to −49 dBm. This is assumed to be the optical power that is available over the entire surface of the integrating chamber of area 78 cm$^2$. A cylindrical chamber with this area is 4 cm high and 4 cm in diameter. This small size for the integrating chamber data bus requires that all the nodes be clustered into close proximity.

Reducing the data rate to a 100 kb/s lower data rate increases the receiver sensitivity to −60 dBm. This enables the size of the integrating chamber to increased to 14 cm high and 14 cm in diameter. This is still too small for many applications. The performance at the low data rate can be improved by using a photodiode with a larger light sensitive area than just 75 µm. Increasing the light sensitive area of the photodiode to 2 mm in diameter, which can support the low data rate of 100 kb/s, increases the received optical power by 28 dB making the received optical power −21 dBm in a 4 cm high and 4 cm diameter integration chamber. Using a receiver sensitivity of −60 dBm at 100 kb/s will allow the integration chamber to be increased to 3 meters high and 3 meters in diameter. This corresponds to a small office where the high albedo walls are provided by the conventional white ceiling and walls in the office. The data bus performance in this case is comparable to that of an optical remote for a television set when the transmitted light is bounced off a wall before being sensed by the television sensor. For this application, an eye-safe wavelength such as 1.55 µm would be used to allow human occupation. This free-space star-coupled optical data bus would require no modifications to the typical office. Low data rate peripheral computer equipment could be supported without connectors or cables via this free-space star-coupled optical data bus and equipment could be added or removed with no impact to the users.

In the 10 Mb/s data rate configuration, the integrating chamber size is small in diameter and height but all of the surface area is available for optical node positioning, which is unlike the flat mirror or spherical mirror configurations where the node array was confined to a portion of the illuminated surface area. Thus, the integrating chamber may support more nodes than the flat mirror or spherical mirror data buses, although at a much lower data rate. For applications involving only satellite command and control the integrating chamber may be preferred. The integrating chamber has upper data rate performance parameters of: data rate of 10 Mb/s; receiver sensitivity of −49 dBm; chamber diameter of 4 cm; chamber height of 4 cm; chamber single bounce optical loss of 10 dB; number of nodes is 32, node cluster size is 78 cm$^2$; threshold above thermal limit is 10 dB.

Figure 4:
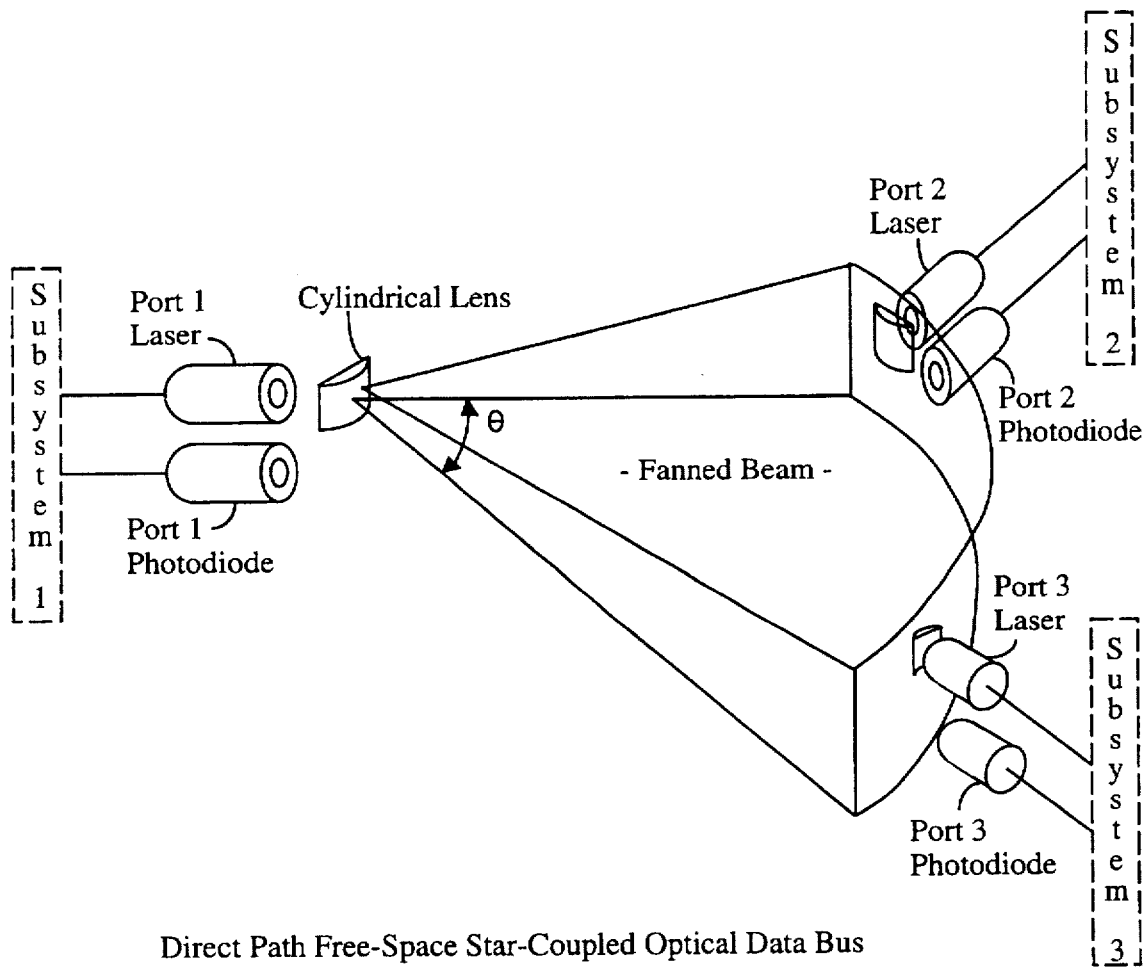
FIG. 4 is a diagram of a direct path free-space star-coupled optical data bus.

Referring to FIG. 4, the direct path free-space star-coupled optical data bus communicates light without using any medium for conveyance such as optical fiber and does not use an intermediate reflection or re-emission surface to distribute light within the free-space volume. By eliminating the medium for conveyance of the light, a connectorless interface is achieved. The optical transmitter and receiver nodes are clustered around a circle each of which supports a modular subsystem. The optical bus is formed by the fact that each subsystem can transmit a fan of light that is simultaneously spread over the optical ports of the other modular subsystems. The interface to the optical data bus is provided by a connectorless optical window port which accommodates the laser transmitter and the photodiode receiver. Each transmitter preferably directs light directly to the other nodes. Cylindrical lenses may be used in front of each laser to fan the transmitted light into an uncollimated fan beam which illuminates all of the other receiver nodes. The nodes are preferably located on the circumference of a circle within a plane of the fan beam. In this way, each subsystem can receive light from any of the other optical ports of the other subsystems. The transmitters can be laser diodes located at the window port nodes, or they can be the ends of optical fibers so that the laser diode transmitters need not be located at the window ports.

The receivers need not have receiving lenses for operation at modest data rates such as 100 Mb/s, and this will reduce the optical alignment requirements. The receivers can be photodiodes located at the node locations of the ring or fiber ends which will collect light and convey it away from the window ports. At the 100 Mb/s data rate using 32 nodes, the nodes may be clustered into a ring 6 cm in diameter when using optical transmitters delivering 200 mW of optical power. The received optical power for this configuration is −37 dBm which will not quite enable operation at a data rate of 1 Gb/s. The 6 cm diameter ring configuration is the smallest ring diameter allowed by the physical size of the lasers and photodiodes mounted in a TO-5 package. Reducing the number of nodes to only 10 will narrow the angle over which the transmitted beam must be spread thereby increasing the received optical power to −33 dBm and allows this 6 cm ring configuration to operate at a data rate of 1 Gb/s.

The direct path free-space star-coupled optical data bus physical arrangement requires that the light be spread uniformly over a fairly large angle theta if a large number of optical ports are used. The symmetry of this arrangement dictates that all nodes be equally spaced around the circumference of the ring, requiring a large spread angle theta which may approach 180°. The orientation of the photodiodes around the ring requires the receiving surface to be aligned to face the center of the ring which does not optimally align this surface to all the emitting lasers. For this reason, receiver sensitivity improvements may be possible using a similar cylindrical lens to that used on the transmitters on each of the receivers.

The cylindrical lenses in front of each laser diode fans the light into an arc over the other optical ports. The lens may require some curvature in the vertical direction to beam the light into a plane of light about 3 mm high at the farthest extent of the ring. This lens could be replaced by a holographic optical element. The receiving photodiodes need not have collection lenses. However, performance could be increased by utilizing cylindrical receiving lenses in front of each photodiode to collect and focus received light. The photodiodes are not oriented normal to the incident light in all cases. For the case where no lenses are considered on the receivers, this angle must be taken into account and adds to the loss in light. The light is fanned uniformly over all the optical ports by using, for example, a 3 mm wide beam in the vertical direction. The available light is most reduced at the adjacent node, which is the node most affected by a poor angle of incidence that is a function of the number of nodes.

Reducing the data rate to 1 Mb/s enables a photodiode with a larger light sensitive area than 75 μm to be used. The larger area reduces the frequency response which is acceptable for a data rate of 1 Mb/s. Using a photodiode with a light sensitive area of 1 mm in diameter and is capable of supporting a data rate of 1 Mb/s, the ring diameter for the 32 node configuration can be expanded to 5 meters in diameter. This free-space distance is applicable to large conference room tables and typical u-shaped conference room table arrangements. Using this free-space star-coupled optical data bus, the attenders of the conference could each receive individual digital copies of the presentation charts and introduce private and public comments or questions without interrupting the conference proceedings. For this application, the eye-safe wavelength of 1.55 μm would be used.

For a data rate of 1 Gb/s where the receiver sensitivity is −33 dBm at 10 dB above the thermal noise limit, only 10 nodes can be supported using 200 mW lasers. This particular data bus is more suitable for 200 mW operation at 100 Mb/s where 32 nodes can be supported with a received optical power of −37 dBm, which is 13 dB above the thermal noise limit. At this modest data rate, the direct path data bus is well-suited for command and control data used on a satellite. A 10 node direct path free-space data has upper data rate performances of: data rate of 1 Gb/s; beam width of 3 mm; receiver sensitivity of −33 dBm; ring diameter of 6 cm; threshold above thermal limit is 10 dB. With 32 nodes, the performance of the direct free path optical data bus is the same except that: data rate is 100 Mb/s; received optical power is − 37 dBm; threshold above thermal limit is 10 dB.

The above preferred embodiments of FIGS. 1 through 4 are examples of a free-space passive star-coupled optical data bus communicating data from any one of the nodes on the optical data bus. Light is distributed simultaneously and uniformly to all the other nodes optically using, in part, uncollimated beams. All nodes can receive data from any other node. Each node has a transceiver comprising a transmitter and receiver. The embodiments employ a distribution means, for example, a mirror, lenses or a re-emission surface, to communicate the light simultaneously and uniformly from one transmitting node to all of the other receiving nodes. Proper addressing of the receiver nodes is had through a suitable protocol structure. The embodiments also use a suitable encoding, for example, non-return-to-zero and a suitable transmission modulation, for example, amplitude modulation. The light carries digital information on the bus. The embodiments further include a connectorless window port for accessing the free-space data bus using free-space transmission instead of a conveying medium, such as a fiber optic. The flat mirror, integrating chamber, spherical mirror and direct path embodiments, among many other possible configurations achieve a passively star-coupled free-space optical data bus. While those skilled in the art may conceive modified and enhanced passively star-coupled free-space optical data buses, those modifications and enhancements may nonetheless fall within the spirit and scope of the following claims.

I claim:

1. An optical data bus for free-space communication of data by optical transmission and reception of light, said bus comprising:

a volume of free-space for communication of said light therein, a plurality of transceiver means disposed about said volume and having at least an associated transmitter means and receiver means for respectively transmitting and receiving said light, and an optical distributing means for uniformly distributing said light from one of said transceiver means simultaneously through said free-space to the remaining ones of said transceiver means, said light is distributed by said optical distributing means as electromagnetic spectrum waves transmitted from said one of said transceiver means to said remaining ones of said transceivers means, said optical distributing means comprises an integrating chamber for receiving said light transmitted by one of said plurality of transceiver means and for re-emitting said transmitted light to every other remaining one of said plurality of transceiver means.

* * * * *